Dec. 30, 1958 M. GOLDBERG 2,866,340
DEVICE FOR TAKING SAMPLES OF LIQUID FOR TESTING
Filed Feb. 2, 1956
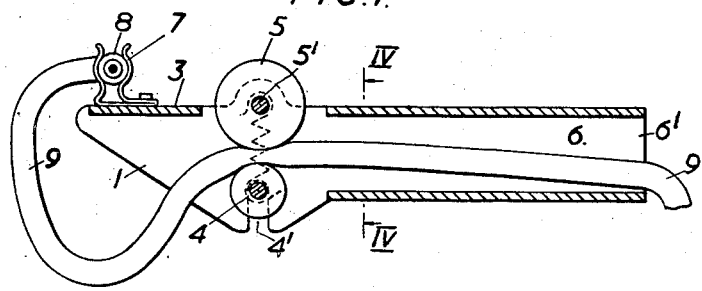
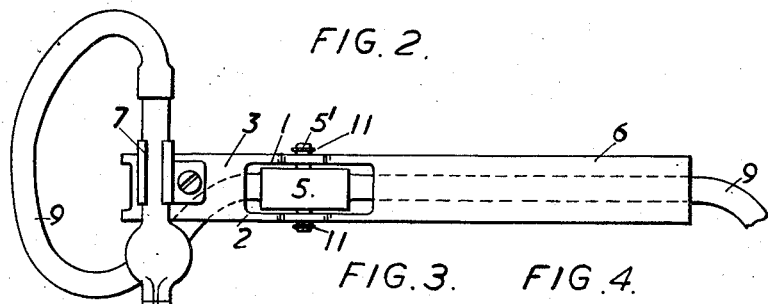
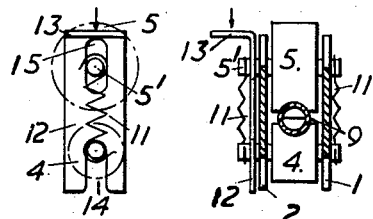
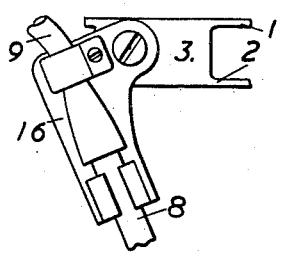
INVENTOR
Moshe Goldberg
BY
Deane Steinberg
ATTORNEY United States Patent Office 2,866,340
Patented Dec. 30, 1958

2,866,340

DEVICE FOR TAKING SAMPLES OF LIQUID FOR TESTING

Moshe Goldberg, Tel-Aviv, Israel

Application February 2, 1956, Serial No. 563,121

Claims priority, application Israel September 6, 1955

1 Claim. (Cl. 73—425.6)

The present invention relates to a device or instrument for taking samples of liquid for testing purposes, e. g. taking blood samples from the human body. When blood tests are to be made a small quantity of blood is taken from a person by inflicting a small wound to the finger or other part of the body and retrieving the blood from said wound by means of a small and narrow pipette to which may be attached a short rubber tube. The mouth of the person taking the blood is applied to the pipette directly or to the said rubber tube and the blood is sucked into the pipette. Obviously this method is not very satisfactory from a hygienic point of view, but apart from that it frequently is necessary to have a predetermined quantity of blood in the pipette. By sucking with the mouth no such exact quantity can be extracted; either too much or not enough blood is sucked up.

It is the object of the present invention to provide an implement by means of which blood samples can easily and conveniently be taken from a previously inflicted wound, or any liquid sample can be taken from any source.

It is a further object of the invention to provide such an implement the operation of which is simple and by means of which exactly measured quantities of liquid can be taken.

It is yet another object of the invention to provide an implement which can be manufactured at reasonable cost and using ordinary manufacturing facilities.

The invention will now be described with reference to the annexed drawing showing the new instrument schematically in Fig. 1 in an elevational section and in Fig. 2 in a top view. Figs. 3, 4 and 5 show constructional details of the new instrument.

Between two plates 1 and 2 (only one plate being seen in Fig. 1), which plates are connected by a bridge 3, are journalled two rollers 4 and 5. Roller 5 is of greater diameter than roller 4 and extends partly out of the space between the plates 1 and 2. The axle of roller 4 is held in vertical slots 4' and is urged towards axle 5' of roller 5 by springs 11 extending between the two axles. Thus sufficient pressure is exerted to collapse any elastic tube 9 passing between the two rollers, and tubes of different diameters can be employed. Plates 1 and 2, at their rear ends, merge into a hollow handle 6 which has a longitudinal passage 6', the latter debouching into the space between the plates 1, 2. On top of bridge 3 is affixed a clamp 7, adapted to hold springily a pipette 8. A tube 9, say of rubber, is connected to the end of pipette 8 and extends through bore 6' into the open, after being passed through the narrow gap between the two rollers 4, 5 and compressed by the same. Clamp 7 being affixed by a screw 7' can be turned to and fro about the latter.

In Figs. 3 and 4 a means is shown for quickly emptying the pipette by relieving the pressure on the tube 9. As seen, in front of plate 2, there is arranged a small plate 12 having an upper horizontally bent marginal portion 13. In the plate 12 there are provided two holes 14, 15, the upper, 15, being elongated. Plate 12 is placed on the axles of rollers 4, 5 behind spring 11. It will be seen that by pressing onto portion 13, in the direction of the arrow in Figs. 3 and 4, the lower roller 4 will be forced downwards thus releasing the pressure, whereupon the vacuum is eliminated and liquid pours out of the pipette. It is sufficient to provide one plate 12 only at one side of the device.

Fig. 5 shows a modified form of clamp 7. In the cases where larger pipettes are to be used, it might be convenient to adjust the angle between handle and pipette and have the latter supported by an arm 16 extending at an adjustable angle from the device.

The said arm may be connected with the device by means of a ball-in-socket joint.

The new implement is used in the following way: The pipette 8 is placed in position in clamp 7 and tube 9 is passed through the gap between the two rollers 4, 5 and the implement can now be used with one single hand. The clamp 7 is conveniently orientated in relation to the direction of the handle 6. The pipette is now applied to a wound from which blood is to be taken and the roller 5 is slowly turned in clockwise direction by the thumb of the person holding the implement. Thus the length of hose between pipette 8 and rollers 4, 5 will lengthen and a vacuum will be built up therein, which increases at the same ratio as this hose portion lengthens. Consequently liquid will be sucked into the pipette when the point of it is applied to such liquid. With the turning of roller 5 in opposite direction, liquid will be forced out of the pipette. Thus the quantity needed for a test can easily be adjusted.

The invention is not restricted to the form shown in the drawing. The pipette need not be held in a clamp, this latter might even be dispensed with. In that case the pipette is held in the left hand of a person who operates the rollers with the fingers of the right hand. The rollers could be made of soft rubber with smooth or fluted circumferential surfaces. In this case springs 11 could in some cases be dispensed with, said rollers yielding sufficiently. Instead of slots 4' a row of holes for the axle of roller 4 could be provided for alternative use. The two rollers may also be of equal size.

Practice has shown that the evacuated space between the head of the column of liquid in the pipette and the rollers sometimes causes vibrations of the liquid column. If desired, a clamp can be put on the rubber tube, e. g. at the point marked by numeral 9 in Fig. 5. In this way only a small air evacuated space remains on top of the liquid column.

What I claim is:

In a device for taking samples of blood and other fluids in small quantities, an elongated hollow handle open at both ends, the top wall of said handle having an opening therein, an upper roller journalled between opposite walls of said handle and projecting through said top wall opening, a lower roller having its axis parallel with the upper roller mounted in said handle for vertical adjustment toward and away from said first roller, resilient means secured to said rollers for urging one toward the other, a compressible tube inserted between said rollers and projecting from both ends of said handle, said projecting roller adapted to be turned by hand to exert pressure on said tube, a pipette secured to one end of said tube, means being provided on said handle to clamp and hold the pipette, and means on said handle for urging the lower roller away from the upper roller to release the pressure of the roller and quickly draining the pipette.

References Cited in the file of this patent

UNITED STATES PATENTS

| 917,442 | Hutchinson | Apr. 6, 1909 |
| 1,098,514 | Maddox | June 2, 1914 |
| 2,194,882 | Bamber | Mar. 26, 1940 |